US008720040B2

(12) United States Patent
Hongo et al.

(10) Patent No.: US 8,720,040 B2
(45) Date of Patent: May 13, 2014

(54) METHOD OF MANUFACTURING A HOLLOW WAVEGUIDE

(75) Inventors: Akihito Hongo, Tsuchiura (JP); Tadashi Koike, Minori-cho (JP)

(73) Assignee: Hitachi Metals, Ltd., Tokyo (JP)

( * ) Notice: Subject to any disclaimer, the term of this patent is extended or adjusted under 35 U.S.C. 154(b) by 864 days.

(21) Appl. No.: 12/230,517

(22) Filed: Aug. 29, 2008

(65) Prior Publication Data

US 2009/0007415 A1 Jan. 8, 2009

Related U.S. Application Data

(62) Division of application No. 11/133,433, filed on May 20, 2005, now Pat. No. 7,664,356.

(30) Foreign Application Priority Data

May 21, 2004 (JP) ................................. 2004-152054

(51) Int. Cl.
H01S 4/00 (2006.01)
(52) U.S. Cl.
USPC ............... 29/592.1; 29/825; 29/600; 385/126
(58) Field of Classification Search
USPC ............ 29/600, 423, 458, 525; 385/125, 127, 385/141, 147; 362/263, 572
See application file for complete search history.

(56) References Cited

U.S. PATENT DOCUMENTS

| 4,652,083 | A | * | 3/1987 | Laakmann | 385/125 |
| 4,844,863 | A | * | 7/1989 | Miyasaka et al. | 419/8 |
| 4,913,505 | A | * | 4/1990 | Levy | 385/147 |
| 4,930,863 | A | * | 6/1990 | Croitoriu et al. | 385/125 |
| 4,947,540 | A | * | 8/1990 | Komachi | 29/600 |
| 5,056,209 | A | * | 10/1991 | Ohashi et al. | 29/517 |
| 5,276,761 | A | * | 1/1994 | Shimoyama et al. | 385/125 |
| 5,325,458 | A | * | 6/1994 | Morrow et al. | 385/125 |
| 5,440,664 | A | | 8/1995 | Harrington et al. | |
| 5,729,646 | A | | 3/1998 | Miyagi et al. | |
| 5,957,858 | A | | 9/1999 | Micheels et al. | |
| 5,995,696 | A | | 11/1999 | Miyagi et al. | |
| 6,691,397 | B2 | * | 2/2004 | Chakravarti | 29/527.1 |

FOREIGN PATENT DOCUMENTS

| JP | 8-234026 | 9/1996 |
| JP | 2002-71973 | 3/2002 |

* cited by examiner

Primary Examiner — Minh Trinh
(74) Attorney, Agent, or Firm — McGinn IP Law Group, PLLC

(57) ABSTRACT

A method of manufacturing a hollow waveguide including a metal pipe and a hollow region formed inside of the metal pipe includes pressure-bonding metal pipes each of which includes a metal material different from each other to form a metal-clad pipe including an inside metal layer and an outside metal layer, and polishing a surface of the inside metal layer.

12 Claims, 5 Drawing Sheets

METHOD OF MANUFACTURING A HOLLOW WAVEGUIDE

The present application is based on Japanese patent application No. 2004-152054, the entire contents of which are incorporated herein by reference.

The present Application is a Divisional Application of U.S. patent application Ser. No. 11/133,433, filed on May 20, 2005 now U.S. Pat. No. 7,664,356.

BACKGROUND OF THE INVENTION

1. Field of the Invention

The present invention relates to a light transmitting medium in an infrared wavelength band and, in particular, to a hollow waveguide suitable for optical energy transmission of high power in the infrared wavelength band and a method of manufacturing the hollow waveguide.

Also, the present invention relates to a light transmitting medium in an ultraviolet wavelength band and, in particular, to a hollow waveguide suitable for optical energy transmission of high power in the ultraviolet wavelength band and a method of manufacturing the hollow waveguide.

2. Description of the Related Art (1) Optical Waveguide for Transmitting Infrared Light Infrared light having a wavelength of 2 µm or more is utilized in various fields such as medicine, industrial working, measurement, analysis, and chemistry. In particular, each of an Er-YAG laser having a wavelength band of 2.94 µm, a CO laser having a wavelength band of 5 µm, and a $CO_2$ laser having a wavelength band of 10.6 µm has high excitation efficiency and can develop high power and has large absorption also for water, and hence is utilized as a light source for medical laser equipment and for industrial processing.

A conventional silica-based optical fiber used for communications produces a large loss of transmission for laser light having a wavelength of 2 µm or more because infrared absorption caused by molecular vibration is large. For this reason, the usual silica-based optical fiber cannot be used as a waveguide for transmitting this infrared laser light. Hence, there have been actively made developments of a new type optical waveguide which can be applied even to an infrared wavelength band of wide application area.

A hollow waveguide provided with a dielectric layer transparent in the wavelength band of light to be transmitted has been developed as an optical waveguide for transmitting infrared light having a wavelength of 2 µm or more and has been proved to have excellent transmission characteristics.

FIG. 5 is a sectional view showing a conventional hollow waveguide 4. The hollow waveguide 4 is constructed of a glass capillary 41, a metal layer 42 formed on the inside wall of the glass capillary 41, a dielectric layer 43 formed on the metal layer 42, and a hollow region 44 formed as a core inside the dielectric layer 43. The glass capillary 41 is a base material for holding the mechanical strength of the hollow waveguide 4. The dielectric layer 43 is transparent in the wavelength band of light to be propagated and usually has a thickness of submicron or less and has a thickness set at an optimum value according to the wavelength of light to be propagated. The metal layer 42 has large optical absorption in the wavelength band of light propagating through the hollow waveguide 4, and hence optical energy does not penetrate deeply into the metal layer 42. Therefore, it is essential only that the thickness of the metal layer 42 in contact with the dielectric layer 43 is a skin depth or more. Light propagating through the hollow waveguide 4 is repeatedly reflected by the boundary between the hollow region 44 and the dielectric layer 43 and the boundary between the dielectric layer 43 and the metal layer 42, thereby being propagated.

Specifically, there is disclosed a hollow waveguide having the metal layer 42 made of silver on the inside wall of the glass capillary 41 by plating and the dielectric layer 43 formed on the metal layer 42 by thermosetting a solution of the precursor of polyimide or a solution having an olefin polymer dissolved therein (for example, Japanese Patent Application Laid-Open Nos. 8-234026 and 2002-71973).

Even if the metal layer 42 is formed on the glass capillary 41 having an extremely smooth surface by plating, the surface roughness of the metal layer 42 becomes larger as the thickness of the metal layer 42 becomes larger. The metal layer 42 having a thickness of several hundred angstroms functions optically to a sufficient degree. Hence, the metal layer 42 is formed in as thin a thickness as possible so as to prevent its surface from losing a mirror-smooth state.

An organic material constructing the dielectric layer 43 such as polyimide and olefin polymer has an infrared absorption peak wavelength specific to the material. However, because the dielectric layer 43 is formed in a sufficiently thin thickness, propagating light in an infrared range except for this infrared absorption peak wavelength is hardly attenuated in the dielectric layer 43. For this reason, the dielectric layer 43 can be assumed to be a transparent material through which the propagating light reaches the metal layer 42. In particular, specific organic materials such as polyimide and olefin polymer do not have a large infrared absorption peak in the oscillation wavelength band of the Er-YAG laser, the CO laser, and the $CO_2$ laser, so that the hollow waveguide 4 can transmit practically important infrared laser light with low transmission loss. Moreover, since the metal layer 42 is formed in a very thin thickness by plating to keep the inside wall of the hollow waveguide smooth, the hollow waveguide 4 can transmit not only infrared laser light but also visible light as guide light.

In addition to the hollow waveguide 4 having the dielectric layer 43 made of the organic material as described above, a hollow waveguide having a dielectric layer formed by chemically altering a part of a metal layer is also developed. For example, there has been known a hollow waveguide in which a silver iodide layer produced by iodinating a part of a metal layer, which is made of silver on the inside wall of a glass capillary by plating, functions as a transparent dielectric layer. The silver iodide is an inorganic substance which is transparent in the infrared wavelength band and does not have an infrared absorption peak specific to the substance like a polymer substance. Thus, the silver iodide can transmit light in the infrared wavelength range with low transmission loss.

In addition to the above-described glass capillary, a resin tube made of fluorine resin or the like having excellent flexibility is proposed as a base material for providing the hollow waveguide with the mechanical strength. Further, for a laser probe mounted at the tip of a long optical transmission line and uses not specially requiring flexibility, there is proposed a base material made by polishing the inside surface of a stainless pipe or the like which is mechanically stronger than the glass capillary. Still further, there is proposed a hollow waveguide in which a pipe itself made of precious metal such as silver is used as a base material so as to save a step of forming a silver layer by plating and has its inside surface polished to a mirror-smooth state to form a dielectric layer.

(2) Optical Waveguide for Transmitting Ultraviolet Light

On the other hand, ultraviolet light having a wavelength of 250 nm or less is utilized in various fields such as medicine, industrial processing, measurement, analysis, and chemistry. In particular, a KrF laser having a wavelength of 248 nm, an ArF laser having a wavelength band of 193 nm, an excimer laser such as an F2 laser having a wavelength band of 157 nm, or a Q switch YAG harmonic laser can produce high power and is important as a light source for semiconductor photolithography equipment, fluorescence analysis, medical equipment, and industrial processing.

A conventional silica-based optical fiber used for communications can transmit light having a wavelength of approximately 200 nm or more with low transmission loss. Moreover, recently, a solid-type silica-based optical fiber has been improved particularly for the purpose of transmitting ultraviolet light.

Absorption in an ultraviolet band is an absorption band caused by electron transition and absorption spectrum characteristic is substantially affected by impurities and structural defects contained in the silica-based optical fiber. Silica-based optical fibers widely used at present have been purified to such an extent that absorption by metallic impurities can be neglected. Hence, transmittance in the ultraviolet band of the silica-based optical fiber is determined by structural defects in silica glass that depend on the manufacturing conditions.

Fine structural defects depend on the manufacturing conditions: for example, oxygen depletion type defects and oxygen excess type defects are caused by an oxidizing/reducing atmosphere when the fiber is manufactured. In a method of manufacturing an optical fiber in which soot-like silica particles are dehydrated in a halogen atmosphere and then are heat-treated to be altered to transparent glass, oxygen depletion type defects are caused to decrease transmittance in the ultraviolet band. Because the content of an OH group is varied by the dehydration treatment, the transmittance in the ultraviolet band depends on the OH group.

In silica glass anhydride subjected to the dehydration treatment, an absorption band caused by Si—Si oxygen depletion type defects is observed at wavelengths of 245 nm and 163 nm. Further, in silica glass made by sintering soot in a reducing atmosphere, an absorption band is observed at a wavelength of 240 nm.

In contrast to this, silica glass made by sintering soot in a He gas atmosphere contains a high concentration of the OH group and does not have an outstanding absorption band observed in a wavelength range from 200 nm to 400 nm. As described above, the transmittance of the silica-based optical fiber for the purpose of transmitting ultraviolet light depends on the content of the OH group.

On the other hand, apart from the solid-type silica-based optical fiber like this, there is proposed, for the purpose of transmitting ultraviolet light, a hollow waveguide made by depositing aluminum on the inside of a hollow glass capillary by a metal organic chemical vapor deposition method (MOCVD) (Optical Alliance, July 1999, pp. 20-22). The advantage of the hollow waveguide can endure higher energy density than the silica-based optical fiber. The maximum transmission energy density of the solid-type silica-based optical fiber is approximately 50 mJ/cm$^2$, whereas the hollow waveguide can transmit a beam having a transmission energy density of 2 J/cm$^2$ or more. Further, even in the case of the silica-based optical fiber improved for the ultraviolet light, the wavelength of 193 nm of the ArF laser is the shortest limit and it is difficult to transmit light in the vacuum ultraviolet band of shorter wavelength. In contrast to this, the hollow waveguide having an aluminum thin film deposited thereon can transmit light having as short a wavelength as approximately 130 nm and can transmit also the F2 laser having a wavelength of 157 nm.

(1) Problems of Hollow Waveguide for Transmitting Infrared Light

However, the conventional hollow waveguide for transmitting infrared light has the following problems. That is, the hollow waveguide 4 using the glass capillary 41 has flexibility but has a possibility of being suddenly broken when it is held in a small bending radius for a long time. Further, the hollow waveguide 4 has a possibility of being broken when it is inserted into the human body or used in use environment where impact or external force is applied thereto, which is not so desirable.

A hollow waveguide using a resin tube made of fluorine resin or the like as a base material has a lower possibility of being broken than a hollow waveguide using a glass capillary but is irregularly varied in a sectional shape and in the bending shape of the whole transmission line by impact or external force, thereby being easily varied in transmission characteristics. Further, in the resin tube, as compared with the glass capillary, the surface of the inside wall is rough and is hard to improve by polishing or etching to such an extent that is achieved in the glass capillary. For this reason, transmission loss is increased in the case of transmitting light having short wavelengths such as visible light.

Moreover, the entire loss of light propagating in the hollow waveguide is converted to heat, and hence the hollow waveguide using a glass capillary or a resin tube having small thermal conductivity as a base material might cause local heating.

In the hollow waveguide formed of the glass capillary, the silver layer formed on the inside wall of the glass capillary, and the dielectric layer made of silver iodide formed by iodinating the inside wall of the silver layer, the silver layer needs to be formed in a thickness larger than an optically contributable thickness so as to avoid the silver layer to be iodinated from being lost. As a result, the surface of the inside wall of the hollow waveguide having silver iodide applied thereto is degraded in the roughness to damage the mirror-smooth state of the silver layer, which is disadvantageous specially for the transmission of light having short wavelengths such as visible light.

When a hollow waveguide is used for use not requiring flexibility, a metal pipe can be advantageously used as the base material of the hollow waveguide in that the metal pipe has large mechanical strength and high thermal conductivity. However, a conventional hollow waveguide, which uses a stainless pipe having its inside surface polished to a mirror-smooth state as a base material and has a silver layer formed on the inside wall of the stainless pipe by plating, loses the smoothness of the surface of the inside wall by plating and hence is remarkably inferior in smoothness to the hollow waveguide formed by plating the glass capillary with silver.

FIG. 6 shows a wavelength-loss characteristic when white light is propagated through a metal hollow waveguide, which is formed of a stainless pipe having its inside wall polished to a mirror-smooth state and a silver layer formed by plating the inside wall of the stainless pipe with silver. FIG. 7 shows a wavelength-loss characteristic when white light is propagated through a metal hollow waveguide, which is formed of a glass capillary and a silver layer formed by plating the inside wall of the glass capillary with silver. Each of the metal hollow waveguides has a length of 40 cm and an inside diameter of 0.7 mm and the same thickness of the silver layer formed by plating.

As shown in FIGS. 6 and 7, the loss of the metal hollow waveguide formed of the stainless pipe is considerably larger than the loss of the metal hollow waveguide formed of the glass capillary. In particular, as the wavelength becomes shorter, the loss becomes larger. It is thought that this is because the inside surface of the stainless pipe is not polished to the same degree of smoothness equal as in the case of the glass capillary or that this is because even if the stainless pipe and the glass capillary are equal to each other in the degree of smoothness, the surface roughness of the silver layer is different between the stainless pipe and the glass capillary because of difference in the base material, that is, the smoothness of the base material cannot be held on the surface of the silver layer. With this characteristic, the hollow waveguide formed of the stainless pipe having its inside surface polished to a mirror-smooth state and the silver layer formed by plating the polished inside surface of the pipe with silver is inferior in transmission loss to the hollow waveguide formed of the glass capillary and the silver layer formed by plating the glass capillary with silver.

Further, the hollow waveguide formed of the glass capillary has problems of being lower in resistance to external force, easily causing local heating because of using glass having low thermal conductivity as the base material, and silver plating being easily peeled off.

Still further, a hollow waveguide is also studied in which in place of the hollow waveguide including a stainless pipe having its inside surface polished and a silver layer formed by plating the polished inside surface with silver, a silver pipe itself has its inside surface polished to eliminate a step of plating the inside surface with metal to keep the surface roughness of the inside wall of the pipe. In this hollow waveguide, the whole base material is silver and hence cost is very much increased. It is known that not only silver but also gold and copper are suitable as such a metal material of a hollow waveguide that is optically contributable to transmitting a laser light in an infrared wavelength band with low loss. It is difficult in practical use in terms of cost to form the base material of the hollow waveguide of gold. Further, silver and copper are remarkably discolored by oxidation or sulfuration, and therefore, it is not preferable that the base material of the hollow waveguide is made of these materials and exposed to outside environment. Still further, the hollow waveguide using any one of these materials as the base material is easily plastically deformed even by small bending and hence is remarkably degraded in transmission characteristics particularly in use environment where the hollow waveguide is repeatedly bent.

(2) Problems of Hollow Waveguide for Transmitting Ultraviolet Light

A conventional hollow waveguide for transmitting ultraviolet light has the following problems.

That is, when a pulse of ultraviolet light is entered into a silica optical fiber commonly used, even if an initial transmittance is excellent, the transmission characteristic is degraded as time elapses during the irradiation of light (Appl. Opt. 27, 1988, p. 3124).

As described above, there have been developed also silica optical fibers for transmitting ultraviolet light that can transmit even ultraviolet light with stability by adjusting the concentration of the OH group. However, such silica optical fibers yet have problems in transmitting the ArF laser and the KrF laser having wide application fields. Further, the silica optical fibers can not stably transmit the F2 laser having a short wavelength and a high-power pulse laser for a long time.

On the other hand, an aluminum hollow waveguide is more promising in the transmission of ultraviolet laser of 190 nm or less in wavelength or of high power intensity than the silica optical fiber. However, in the above-described hollow waveguide having an aluminum thin film deposited inside the silica glass capillary by the MOCVD method, the aluminum thin film does not have a sufficiently strong adhesion force and hence is easily peeled off. In particular, in the case of transmitting the ultraviolet light by the hollow waveguide, the hollow space is commonly evacuated to a vacuum or filled with rare gas so as to prevent oxygen in the air from being altered to ozone absorbing the ultraviolet light to increase transmission loss. For this reason, there is a possibility that when the aluminum thin film deposited inside does not have a sufficiently strong adhesion force, the aluminum thin film might be peeled off when the gas is sucked or introduced.

Further, to deposit the aluminum thin film inside the silica glass capillary, an expensive MOCVD apparatus is required.

Still further, the hollow waveguide using the glass capillary like this is low in resistance to the external force and hence might be broken by impact or bending.

SUMMARY OF THE INVENTION

It is an object of the invention to provide a hollow waveguide that is mechanically strong, is not broken even in the bending of a small bending radius, is excellent in thermal conductivity, and is capable of transmitting propagating light with low transmission loss, and a method of manufacturing the hollow waveguide.

It is another object of the invention to provide a hollow waveguide that can keep stable transmission efficiency also for ultraviolet laser light having high peak power and a short wavelength for a long time and a method of manufacturing the hollow waveguide.

(1) According to One Aspect of the Invention, a Hollow Waveguide Comprises:

a metal-clad pipe comprising an inside metal layer and an outside metal layer; and a hollow region formed inside of the metal-clad pipe, wherein the metal-clad pipe is formed by pressure-bonding metal pipes each of which comprises a metal material different from each other.

Herein, the pressure-bonding means a process that can be performed by any of known methods of bonding two metal pipes with different diameters by applying pressure and thereby forming them into a single metal pipe with an inside metal layer and an outside metal layer, i.e., the metal-clad pipe. For example, the known methods can include extruding and rolling.

(2) According to Another Aspect of the Invention, a Hollow Waveguide Comprises:

a metal-clad pipe comprising an inside metal layer and an outside metal layer;

a dielectric layer formed on an inner wall of the metal-clad pipe; and a hollow region formed inside of the dielectric layer, wherein the metal-clad pipe is formed by pressure-bonding metal pipes each of which comprises a metal material different from each other.

(3) According to Another Aspect of the Invention, a Method of Manufacturing a Hollow Waveguide Including a Metal Pipe and a Hollow Region Formed Inside of the Metal Pipe, Comprises the Steps of:

pressure-bonding metal pipes each of which comprises a metal material different from each other to form a metal-clad pipe comprising an inside metal layer and an outside metal layer; and polishing a surface of the inside metal layer.

(4) According to Another Aspect of the Invention, a Method of Manufacturing a Hollow Waveguide Including a Metal Pipe and a Hollow Region Formed Inside of the Metal Pipe, Comprises the Steps of:

pressure-bonding metal pipes each of which comprises a metal material different from each other to form a metal-clad pipe comprising an inside metal layer and an outside metal layer;

polishing a surface of the inside metal layer; and forming a dielectric layer on the polished surface of the inside metal layer.

(5) According to Another Aspect of the Invention, a Hollow Waveguide Comprises:

a metal-clad pipe comprising an inside metal layer and an outside metal layer each of which comprises a metal material different from each other; and a hollow region formed inside of the metal-clad pipe, wherein strength of bonding between the outside metal layer and the inside metal layer is 10 MPa or more.

It is preferable that the inside metal layer is made of a metal material having a large absolute value of complex index of refraction.

The inside metal layer may comprise gold, silver, or copper, and the outside metal layer may comprises stainless steel, phosphorous bronze, titanium, or titanium alloy.

The inside metal layer may comprise aluminum, and the outside metal layer may comprise stainless steel, phosphorous bronze, titanium, or titanium alloy.

The inside metal layer may comprise silver, and the dielectric layer may comprise silver iodide.

The inside metal layer may comprise aluminum, and the dielectric layer may comprise aluminum oxide.

The dielectric layer comprising aluminum oxide preferably comprises a thickness of 0.1 µm or less.

According to the present invention, there is provided a hollow waveguide that is mechanically strong, is not broken even in the bending of a small bending radius, is excellent in thermal conductivity, and is capable of transmitting propagating light with low transmission loss.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Preferred embodiments of the invention will be described in detail with reference to the accompanying drawings.

First Embodiment

Figure 1:
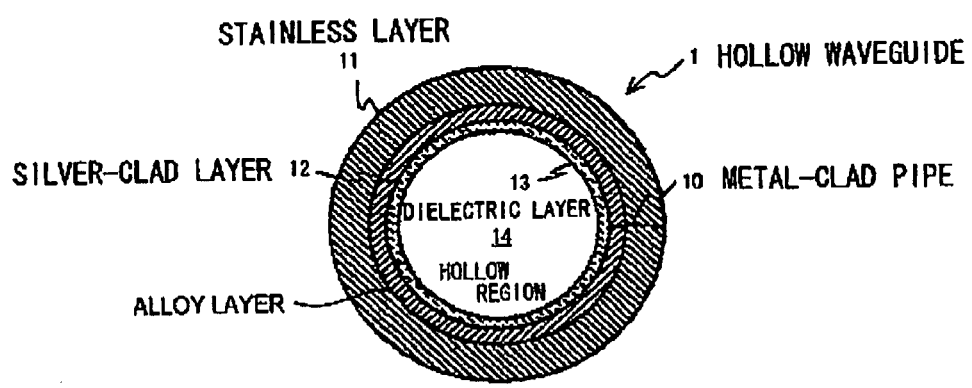
FIG. 1 is a sectional view showing a hollow waveguide of a first embodiment according to the present invention.

FIG. 1 is a sectional view showing a hollow waveguide 1 of a first embodiment according to the present invention.

As shown in FIG. 1, the hollow waveguide 1 is formed of a silver-clad stainless pipe (metal-clad pipe) 10, which is integrally formed as a metal pipe made of a silver-clad layer 12 and a stainless layer 11 by pressure-bonding (e.g., extruding or rolling) a cylindrical silver pipe arranged inside to a stainless pipe arranged outside, and an olefin polymer layer formed as a dielectric layer 13 on the inside wall of the metal-clad pipe 10. A hollow region 14 inside the dielectric layer 13 corresponds to a core for propagating light.

A method of manufacturing the hollow waveguide 1 will be described.

Figure 3:
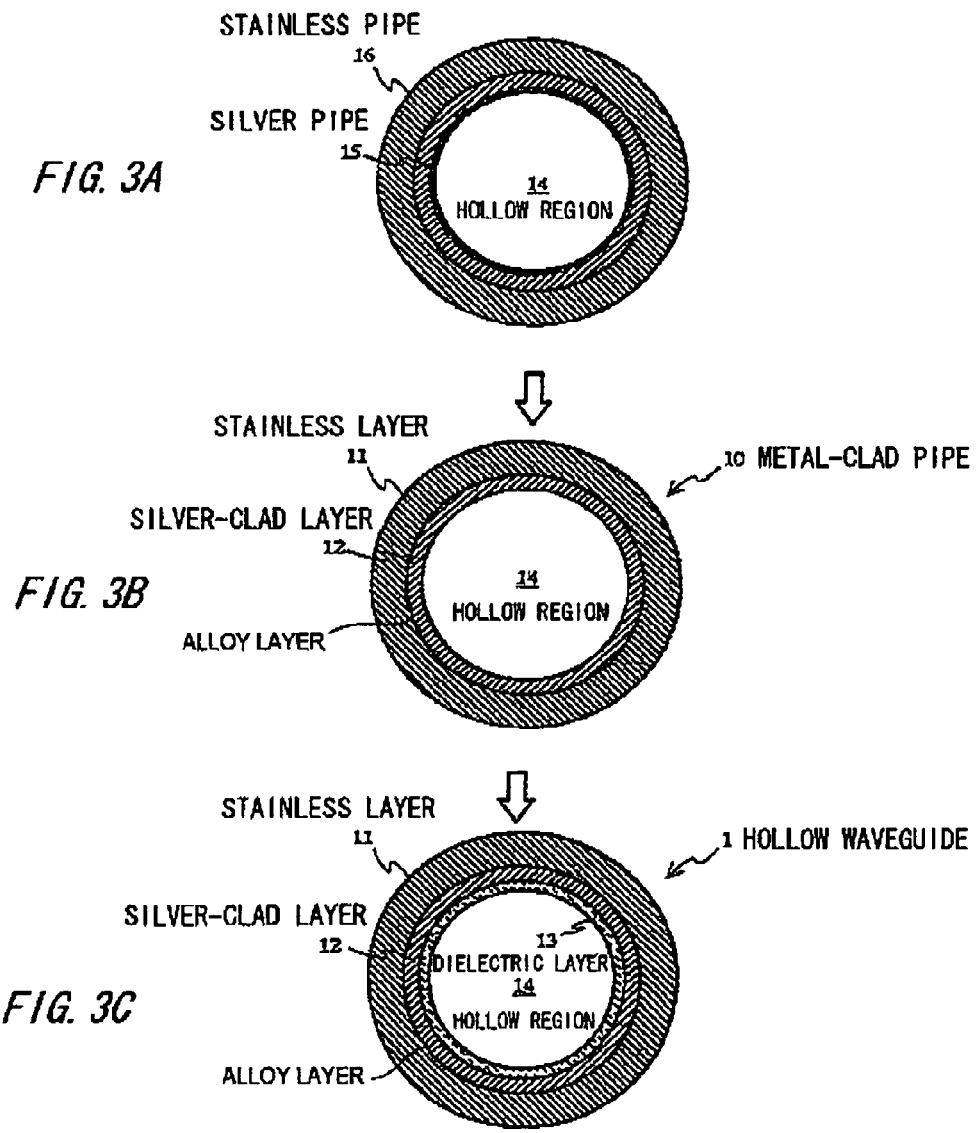
FIGS. 3A to 3C are sectional views showing the steps of manufacturing the hollow waveguide of the first embodiment.

As shown in FIG. 3A, in this embodiment, first, two metal pipes of a stainless pipe 16 and a silver pipe 15 having an outside diameter smaller than the inside diameter of the stainless pipe 16 are prepared, then the silver pipe 15 is inserted into the stainless pipe 16, and then the stainless pipe 16 is extruded to form a two-layer laminated pipe in which a stainless layer is pressure-bonded onto a silver layer. Thereafter, the two-layer laminated pipe is repeatedly drawn to a desired final shape to produce a silver-clad stainless pipe (metal-clad pipe) 10 having a small diameter.

A layer formed of the inside silver pipe 15 and a layer formed of the outside stainless pipe 16 of the formed silver-clad stainless pipe 10 are called a silver-clad layer 12 and a stainless layer 11, respectively. The strength of bonding between the silver-clad layer 12 and the stainless layer 11 is 10 MPa or more. The thickness of the silver-clad layer 12 in the silver-clad stainless pipe 10 is sufficiently larger than a silver film formed by plating. Hence, even if the silver-clad stainless pipe 10 is subjected to bending or other working, the silver-clad layer 12 is not peeled off.

The hollow waveguide 1 is formed in the following sizes: for example, the outside diameter and the inside diameter of the metal-clad pipe 10 are 1.1 mm and 0.66 mm, respectively; the thickness of the stainless layer 11 is 0.15 mm; and the thickness of the silver-clad layer 12 is 0.07 mm. The thickness of the silver-clad layer 12 is preferably made 0.05 mm or more to make allowance for polishing and is preferably made smaller than the thickness of the stainless layer 11 so that the silver-clad layer 12 and the stainless layer 11 are concentrically uniformly formed and that the silver-clad layer 12 is prevented from being deformed and peeled off by bending or other working.

In general, gold, silver, and copper which are used as the materials of the inside metal pipe suitable for a hollow waveguide are soft and hence are easily plastically deformed as compared with stainless steel, phosphor bronze, titanium, and titanium alloy which are used as the materials of the outside metal pipe. Hence, the thickness of the inside metal pipe is preferably made ½ or less times smaller than the thickness of the outside metal pipe.

Next, as shown in FIG. 3B, the inside wall of the silver-clad layer 12 is mechanically chemically polished to a mirror-smooth state. This process uses elution by chemical polishing and abrasion action by abrasives in combination and can not only smooth the inside surface but also prevent part of the silver-clad layer 12 from developing a work-altering layer. When comparing roughness on the inside surface of the silver-clad layer 12 before and after polishing, an arithmetical mean deviation of profile Ra could be reduced from 1.1 µm to 0.001 µm and a maximum roughness Rmax could be reduced from 8.9 µm to 0.03 µm. The hollow waveguide according to the present invention mainly aims to propagate infrared light but at the same time can be applied also to the propagation of visible light having a shorter wavelength as guide light. Hence, as to inside surface roughness, it is preferable that Ra is preferably made ½₀₀ or less times smaller than the wavelength of light to be propagated and that Rmax is made ½₀ or less times smaller than the wavelength of light to be propagated. Assuming that an allowance of 0.02 mm is made for a decrease in the thickness of the polished silver-clad layer 12, the resultant final inside diameter of the silver-clad stainless pipe 10 is made 0.7 mm.

Finally, as shown in FIG. 3C, a solution into which an olefin polymer is dissolved is poured inside the silver-clad stainless pipe 10 having its inside surface polished to a mirror-smooth state and then is cured by heat treatment. With this, the hollow waveguide 1 having the surface of the silver-clad layer 12 coated with an olefin polymer layer (dielectric layer 13) is produced. The film thickness of the dielectric layer 13 is made 0.3 µm in consideration of the wavelength of light to be propagated so as to transmit $CO_2$ laser light having a wavelength of 10.6 µm.

Next, the operation of this embodiment will be described.

The hollow waveguide 1 propagates laser light with the metal-clad pipe 10 and the dielectric layer 13 used as a clad layer and with the hollow region 14 used as a core. More specifically, the laser light is repeatedly reflected by the boundary between the hollow region 14 and the dielectric layer 13 and by the boundary between the dielectric layer 13 and the silver-clad layer 12, thereby being propagated in the direction of propagation (in the longitudinal direction of the hollow waveguide 1). The hollow waveguide 1 of this embodiment can transmit $CO_2$ laser light having a wavelength of 10.6 µm through a waveguide length of 40 cm at a transmittance of 95% or more.

Because the stainless pipe 16 is used as the base material of the hollow waveguide 1, the hollow waveguide 1 is mechanically strong and is not plastically deformed by the bending of a small bending radius, external pressure, or the like and hence is hardly broken or degraded in transmission characteristics. Moreover, both of the stainless layer 11 and the silver-clad layer 12 forming the metal-clad pipe 10 are made of metal having large thermal conductivity and hence can prevent local heating. Because the metal-clad pipe 10 has its inside metal layer made of silver having a large absolute value of complex index of refraction, the metal-clad pipe 10 can be made a metal-clad pipe having a large refractive index to reduce radiation loss in propagating light. Moreover, because the silver pipe 15 is pressure-bonded (e.g., extruded or rolled) onto the stainless pipe 16 to form the metal-clad pipe 10, the silver pipe 15 is hardly peeled off from the stainless layer 11 that is the base material of the silver-clad layer 12.

Figure 2:
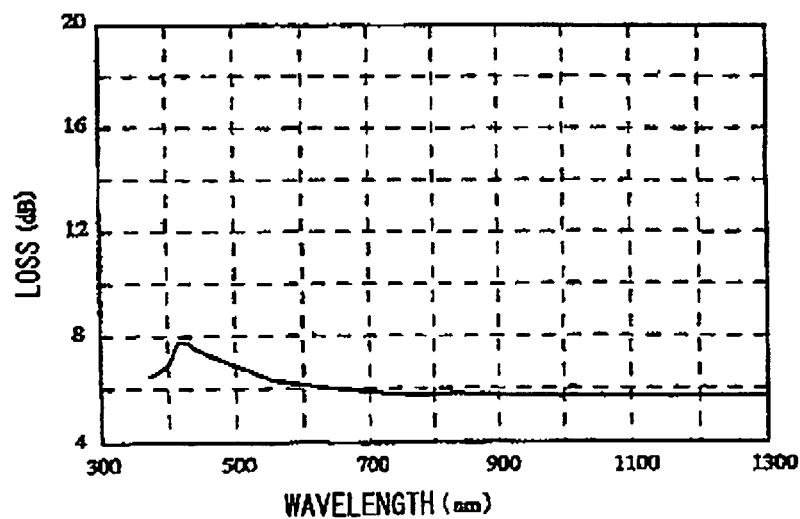
FIG. 2 is a wavelength-loss characteristic diagram of the silver hollow waveguide using a metal-clad pipe comprising an inside silver layer and an outside stainless-steel layer as the base material according to the present invention.
Figure 6:
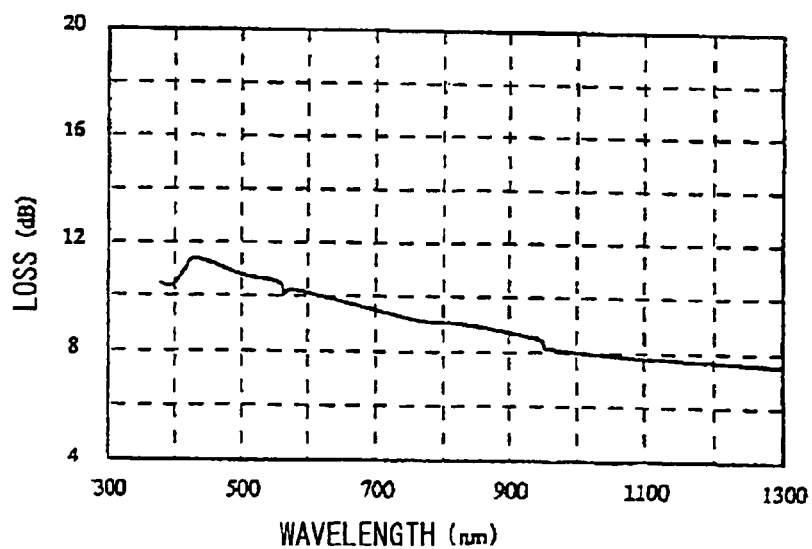
FIG. 6 is a wavelength-loss characteristic diagram of the silver hollow waveguide using a stainless steel as the base material of the hollow waveguide which is made by the conventional method.
Figure 7:
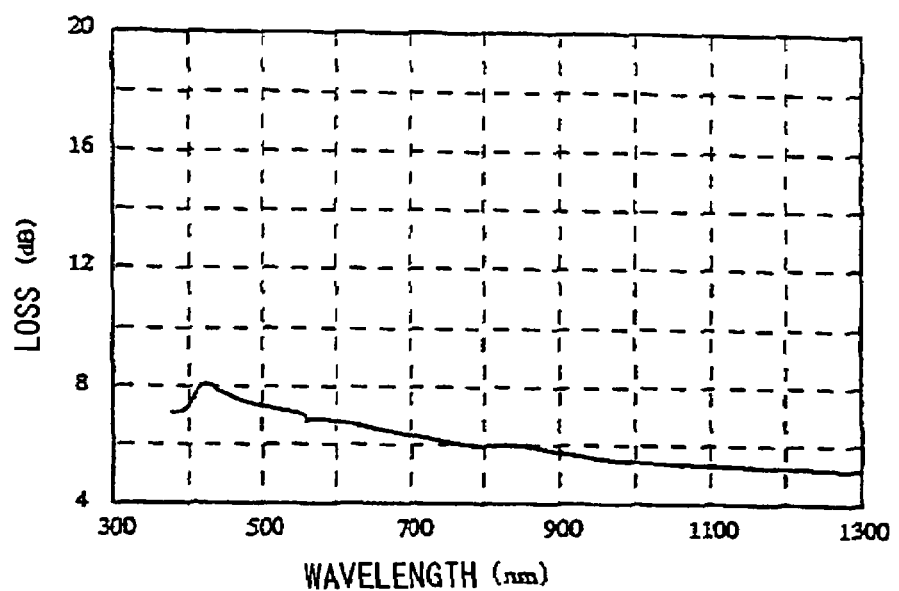
FIG. 7 is a wavelength-loss characteristic diagram of the silver hollow waveguide using a glass capillary as the base material of the hollow waveguide which is made by the conventional method.

Here, the wavelength-loss characteristic of the silver hollow waveguide 1 shown in FIG. 2 is compared with the wavelength-loss characteristics shown in FIGS. 6 and 7.

FIG. 2 is the wavelength-loss characteristic when white light is propagated through the silver hollow waveguide (metal-clad pipe) 10 having the inside wall of the silver-clad layer 12 polished to a mirror-smooth state. As shown in FIG. 2, the wavelength-loss characteristic of the silver hollow waveguide 10 is a characteristic in which loss is increased in a short wavelength band but is smaller in any wavelength band as compared with the wavelength-loss characteristic of a silver hollow waveguide shown in FIG. 6 and having a silver layer formed on the inside wall of the stainless pipe by plating. Moreover, as compared with the wavelength-loss characteristic of a silver hollow waveguide shown in FIG. 7 and having a silver layer formed on the inside wall of a glass capillary by plating, propagation loss is on approximately the same level between them. Hence, the hollow waveguide 1 of this embodiment has an advantage of using the stainless pipe as the base material and can transmit light with low transmission loss.

Further, from the characteristic curve shown in FIG. 2, it is found that the refractive index of the silver-clad layer 12 of this embodiment is closer to the refractive index of silver in the form of bulk than the refractive index of the silver layer formed by plating.

Still further, according to the method of manufacturing the hollow waveguide 1 of this embodiment, as described above, it is possible to manufacture a hollow waveguide that is strong in the mechanical strength, is resistant to be deformed by the bending of a small bending radius, impact, and external pressure, and also in the optical characteristic, can propagate light from a visible light wavelength band to an infrared wavelength band with low propagation loss.

While the olefin polymer is used for the dielectric layer 13 in the hollow waveguide 1 of this embodiment, it is also recommended as a modification that part of the sliver-clad layer is iodinated to form a dielectric layer made of silver iodide on the inside wall of the silver-clad layer.

A method of manufacturing the hollow waveguide having this dielectric layer made of silver iodide is the same as the method of manufacturing the hollow waveguide 1 until the step shown in FIGS. 3A and 3B, and thereafter, the inside wall of the silver pipe is polished and then part of the silver-clad layer is chemically altered into silver iodide. In this method, part of the silver-clad layer is chemically altered to form a silver iodide layer (dielectric layer), and hence the silver-clad layer needs to be formed in consideration of the thickness of the silver iodide layer.

In a conventional hollow waveguide made by forming a silver-plated layer on the inside wall of a glass capillary and by chemically altering part of the silver-plated layer into a silver iodide layer, the thickness of the silver-plated layer needs to be made larger by the thickness of silver iodide layer, and hence the surface of the inside wall of the silver-plated layer becomes rough. As compared with this conventional hollow waveguide, in this embodiment, the silver-clad stainless pipe having the inside wall polished to a mirror-smooth state is used and hence can keep the inside wall in the mirror-smooth state, which resulting in making the inside wall smoother than a case where the inside wall of the glass capillary is plated with silver and hence in being able to transmit laser light with low loss. Moreover, there is produced the same effect as the above-described hollow waveguide 1.

While the silver pipe 15 is used for the inside clad layer of the metal-clad pipe in the hollow waveguide 1 of this embodiment, even if a pipe made of not only silver but also metal having a large absolute value of complex index of refraction such as gold and copper is used in the hollow waveguide not using the dielectric layer made of silver iodide, the pipe can similarly transmit laser light in the infrared wavelength band with low loss.

Moreover, while the stainless pipe 16 is used for the outside metal pipe in the hollow waveguide 1 of this embodiment, the material to be used is not limited to the stainless pipe but it is also recommendable to use a phosphorous bronze pipe resistant to plastic deformation, titanium which is nontoxic even if it is inserted into a human body, or a titanium alloy such as nickel titanium.

Second Embodiment

Figure 4:
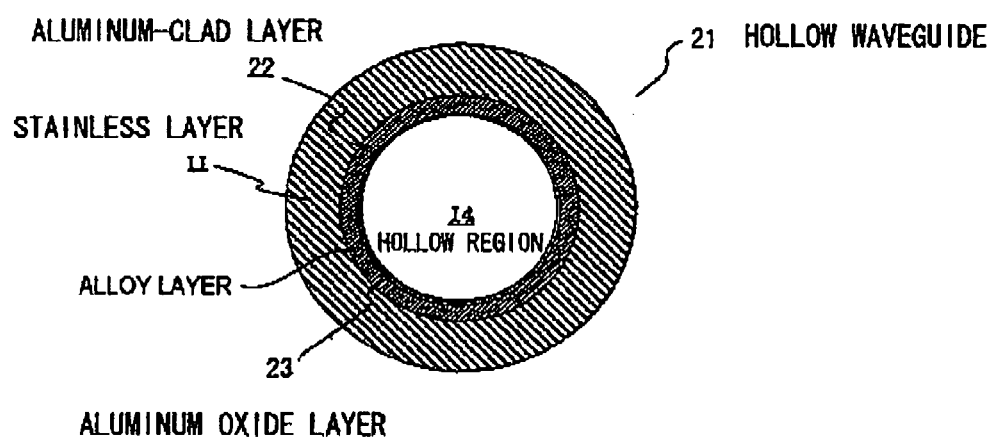
FIG. 4 is a sectional view showing a hollow waveguide of a second embodiment according to the present invention.
Figure 5:
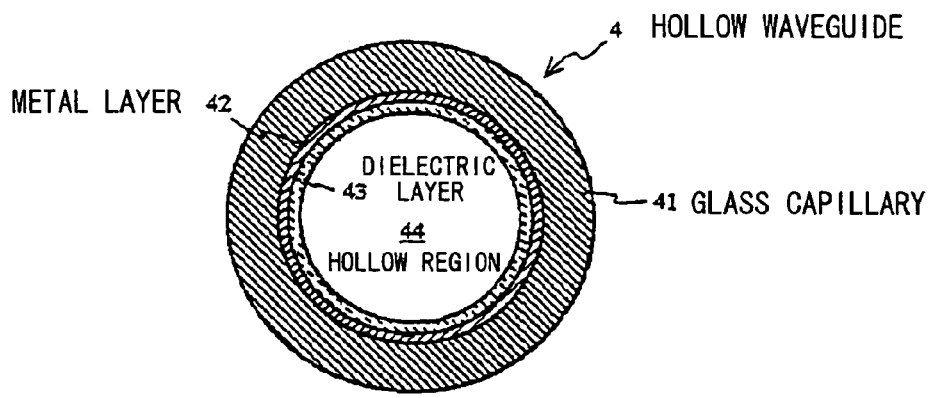
FIG. 5 is a sectional view showing the conventional hollow waveguide.

FIG. 4 is a sectional view showing a hollow waveguide 21 of a second embodiment according to the present invention.

In FIG. 4, the same constituent elements as shown in FIG. 1 are denoted by the same reference symbols as used in FIG. 1.

As shown in FIG. 4, the hollow waveguide 21 is formed of an aluminum-clad stainless pipe (composite metal pipe) 20, which is integrally formed as a metal pipe made of an aluminum-clad layer 22 and a stainless layer 11 by pressure-bonding (e.g., extruding or rolling) a cylindrical aluminum pipe arranged inside to a stainless pipe arranged outside, and having the inside wall surface of the aluminum-clad layer 22 polished. The inside wall surface of the aluminum-clad layer 22 is oxidized to form an aluminum oxide ($Al_2O_3$) layer 23 and ultraviolet light propagates through the hollow region 14.

Next, a method of manufacturing this hollow waveguide 21 will be described.

In this embodiment, first, two metal pipes of a stainless pipe and an aluminum pipe having an outside diameter smaller than the inside diameter of the stainless pipe are prepared, the aluminum pipe is inserted into the stainless pipe, and then the stainless pipe is extruded to form a two-layer laminated pipe in which a stainless layer is pressure-bonded (e.g., extruded or rolled) onto an aluminum layer. Thereafter, the two-layer laminated pipe is repeatedly drawn to a desired final shape to produce an aluminum-clad stainless pipe 20 having a small diameter.

A layer formed of the inside aluminum pipe and a layer formed of the outside stainless pipe of the formed aluminum-clad stainless pipe 20 are called an aluminum-clad layer 22 and a stainless layer 11, respectively. The strength of bonding between the aluminum-clad layer 22 and the stainless layer 11 is 10 MPa or more. The thickness of the aluminum-clad layer 22 in the aluminum-clad stainless pipe 20 is sufficiently larger than an aluminum film formed in a glass capillary by a MOCVD method. Hence, even if the aluminum-clad stainless pipe 20 is subjected to bending or other working, the aluminum-clad layer 22 is not peeled off.

The hollow waveguide 21 is formed in the following sizes: for example, the outside diameter and the inside diameter of the aluminum-clad stainless pipe 20 are 1.1 mm and 0.66 mm, respectively; the thickness of the stainless layer 11 is 0.15 mm; and the thickness of the aluminum-clad layer 22 is 0.07 mm. The thickness of the aluminum-clad layer 22 is preferably made 0.05 mm or more to make allowance for polishing.

Moreover, the thickness of the aluminum-clad layer 22 is preferably made smaller than the thickness of the stainless layer 11 so that the aluminum-clad layer 22 and the stainless layer 11 are concentrically uniformly formed and that the aluminum-clad layer 22 is prevented from being deformed and peeled off by bending or other working. In addition to the stainless steel, phosphorous bronze hard to deform, titanium which is nontoxic and safe even if it is inserted into the human body and is light in weight, and titanium alloy such as nickel titanium are used as the materials of the outside metal pipe. Aluminum is softer and is more easily plastically deformed as compared with these materials expected to be used as the material of the outside metal pipe, and hence the thickness of the inside metal pipe (aluminum pipe) is preferably made ½ or less times smaller than the thickness of the outside metal pipe.

Next, the inside wall surface of the aluminum-clad layer 22 is mechanically chemically polished to a mirror-smooth state. This process uses elution by chemical polishing and abrasive action by abrasives in combination. When comparing roughness on the inside surface before and after polishing, an arithmetical mean deviation of profile Ra could be reduced from 1.1 µm to 0.01 µm and a maximum roughness Rmax could be reduced from 9 µm to 0.03 µm. Assuming that an allowance of 0.02 mm is made for a decrease in the thickness of the polished aluminum-clad layer 22, the resultant final inside diameter of the aluminum-clad stainless pipe 20 is made 0.7 mm.

More preferably, the aluminum-clad stainless pipe 20 having its inside wall surface finally polished to a mirror-smooth state is subjected to high-temperature heat treatment with steam flowed inside to oxidize the inside wall surface of the aluminum-clad stainless pipe 20 to form an aluminum oxide layer 23. With this, it is possible to prevent the chemical alteration of the aluminum-clad layer 22 and to prevent abrasion caused by ultraviolet laser light of high power. This effect can be sufficiently produced by the aluminum oxide layer 23 having a thickness of 0.1 µm or less.

Next, the effect of this embodiment will be described.

Because the stainless pipe is used as the base material of the hollow waveguide 21, the hollow waveguide 21 is mechanically strong and is resistant to being deformed by the bending of a small bending radius, external pressure, or the like, and hence is hardly broken or degraded in transmission characteristics.

Further, both of the stainless layer 11 and the aluminum-clad layer 22 are made of metal having large thermal conductivity and hence can prevent local heating even if they are heated by transmitting laser light.

Still further, because the aluminum pipe is pressure-bonded (e.g., extruded or rolled) onto the stainless pipe to form the aluminum-clad stainless pipe 20, the aluminum-clad layer 22 is resistant to being peeled off from the stainless layer 11 of the base material.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A method of manufacturing a hollow waveguide including a metal pipe and a hollow region formed inside of the metal pipe, said method comprising:

preparing a first metal pipe comprising a first metal material;

preparing a second metal pipe comprising a second metal material different from the first metal material and having an outside diameter smaller than an inside diameter of the first metal pipe;

inserting the second metal pipe into the first metal pipe;

pressure-bonding the first and second metal pipes to directly bond the fast and second metal pipes with each other to form a metal-clad pipe comprising an inside metal layer and an outside metal layer;

polishing a surface of the inside metal layer; and forming a dielectric layer on the polished surface of the inside metal layer, wherein an alloy layer is formed by the pressure bonding at an interface between the inside metal layer and the outside metal layer, wherein the inside metal layer comprises aluminum, wherein the dielectric layer comprises aluminum oxide, and wherein the dielectric layer has a thickness of 0.1 µm or less.

2. The method according to claim 1, wherein the inside metal layer further comprises silver, and wherein the dielectric layer comprises silver iodide.

3. The method according to claim 1, wherein the inside metal layer contacts the outside metal layer.

4. The method according to claim 1, wherein the pressure-bonding comprises applying pressure to bond the metal pipes to form the metal-clad pipe.

5. The method according to claim 1, wherein the pressure-bonding comprises one of an extruding and a rolling.

6. The method according to claim 1, wherein the pressure-bonding is devoid of plating the metal pipes.

7. A method of manufacturing a hollow waveguide including
   a metal pipe
and a hollow region formed inside of the metal pipe, said method comprising:
   pressure-bonding metal pipes each of which comprises a metal material different from each other to form a metal-clad pipe comprising an inside metal layer and an outside metal layer;
   polishing a surface of the inside metal layer; and
   forming a dielectric layer on the polished surface of the inside metal layer,
   wherein the inside metal layer comprises aluminum and the dielectric layer comprises aluminum oxide, and
   wherein the dielectric layer has a thickness of 0.1 µm or less.

8. The method according to claim 7, wherein the inside metal layer comprises silver, and
   wherein the dielectric layer comprises silver iodide.

9. The method according to claim 7, wherein the inside metal layer contacts the outside metal layer.

10. The method according to claim 7, wherein the pressure-bonding comprises applying pressure to bond the metal pipes to form the metal-clad pipe.

11. The method according to claim 7, wherein the pressure-bonding comprises one of an extruding and a rolling.

12. The method according to claim 7, wherein the pressure-bonding is devoid of plating the metal pipes.

* * * * *